(12) United States Patent
Claussnitzer

(10) Patent No.: US 6,279,960 B1
(45) Date of Patent: Aug. 28, 2001

(54) LABEL SHEET FOR ANNULAR LABELS FOR COMPACT DISKS

(76) Inventor: Werner Claussnitzer, Boeddinghausstrasse 2, D-42329 Wuppertal (DE)

( * ) Notice: Subject to any disclaimer, the term of this patent is extended or adjusted under 35 U.S.C. 154(b) by 0 days.

(21) Appl. No.: 09/297,659
(22) PCT Filed: Nov. 5, 1997
(86) PCT No.: PCT/EP97/06108
§ 371 Date: Jul. 30, 1999
§ 102(e) Date: Jul. 30, 1999
(87) PCT Pub. No.: WO98/20493
PCT Pub. Date: May 14, 1998

(30) Foreign Application Priority Data

Nov. 5, 1996 (DE) .......................................... 296 19 143 U

(51) Int. Cl.[7] .............................. B32B 3/00; B32B 31/04; B42D 15/00; G11B 7/00
(52) U.S. Cl. .................................. 283/81; 283/79; 283/80; 283/101; 283/105; 40/340; 40/638; 40/674; 428/40.1; 428/40.9; 428/41.1; 428/41.2; 428/42.1; 428/42.2; 428/42.3; 428/66.6; 428/66.7
(58) Field of Search ................................. 283/79, 80, 81, 283/101, 105; 40/340, 638, 674; 428/40.1, 40.9, 41.1, 41.2, 42.1, 42.2, 42.3, 66.6, 66.7

(56) References Cited

U.S. PATENT DOCUMENTS

| | | | |
|---|---|---|---|
| 2,734,748 | * | 2/1956 | Parvin ..................................... 274/42 |
| 4,032,687 | * | 6/1977 | Hornby, Jr. ............................... 428/1 |
| 4,903,255 | | 2/1990 | Sugaya et al. . |
| 5,518,325 | | 5/1996 | Kahle . |
| 5,543,001 | * | 8/1996 | Casillo et al. ........................ 156/60 |

(List continued on next page.)

FOREIGN PATENT DOCUMENTS

| | | |
|---|---|---|
| 295 01 513.6 U | 2/1995 | (DE) . |
| 196 20 629 A1 | 5/1996 | (DE) . |
| 296 10 644 U1 | 6/1996 | (DE) . |
| 296 13 123 U1 | 7/1996 | (DE) . |
| 297 02 498 U1 | 2/1997 | (DE) . |
| 0 070 031 A2 | 7/1982 | (EP) . |
| 0 329 122 A2 | 2/1989 | (EP) . |
| 0 514 156 A2 | 5/1992 | (EP) . |
| 0 628 956 A1 | 4/1994 | (EP) . |
| 2 203 278 A | 9/1987 | (GB) . |
| 2 290 526 A | 6/1994 | (GB) . |
| PCT/DE97/01036 | 5/1997 | (WO) . |

*Primary Examiner*—A. L. Wellington
*Assistant Examiner*—Mark T. Henderson
(74) *Attorney, Agent, or Firm*—Schiff Hardin & Waite

(57) ABSTRACT

A label sheet having at least two labels for a compact disc. The compact disc has a read side and a reverse side with an outer diameter of the readable or writable area of the read side being less than the outer diameter of the disc and having a first inner diameter forming an aperture for the disc and a second inner diameter which is larger than the first forming a step. The labels have a dimension so that an inner diameter of the label forming an aperture or opening in the label is greater than the second internal diameter of the disc, preferably by an amount of 2 mm to 4 mm, and the label has an outer diameter which is less than the outer diameter of the readable or writable area, so that an annular ring of the readable area is visible around the periphery of the label.

18 Claims, 3 Drawing Sheets

U.S. PATENT DOCUMENTS

| | | | |
|---|---|---|---|
| 5,715,934 | * | 2/1998 | Tobol et al. .......................... 206/232 |
| 5,732,979 | * | 3/1998 | Finke et al. ............................ 283/81 |
| 5,770,289 | | 6/1998 | Tracy . |
| 5,799,982 | * | 9/1998 | McClure et al. ....................... 283/81 |
| 5,846,624 | * | 12/1998 | Denklau et al. ..................... 428/42.3 |
| 5,851,620 | * | 12/1998 | Nakajima et al. ................... 428/64.1 |

* cited by examiner

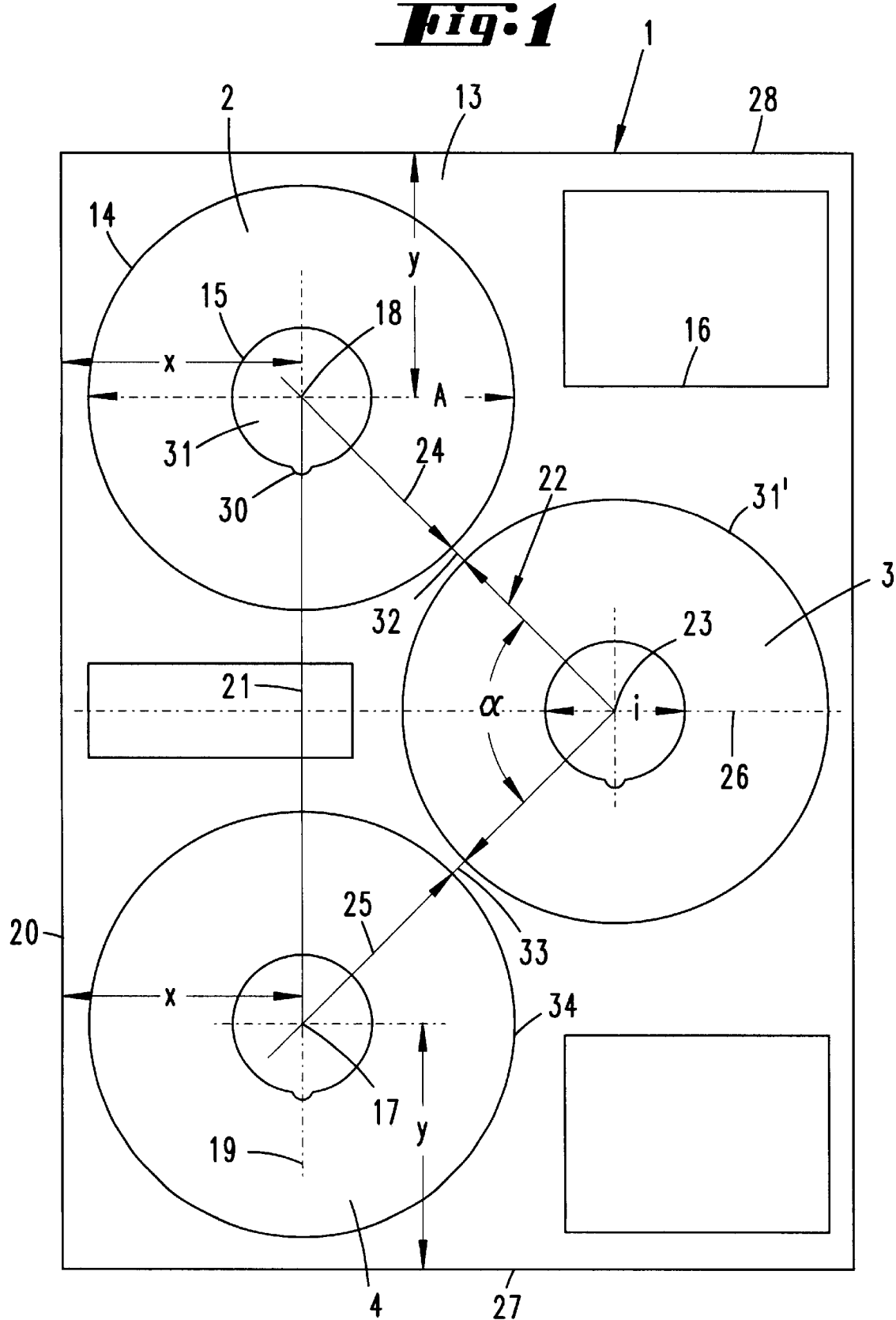

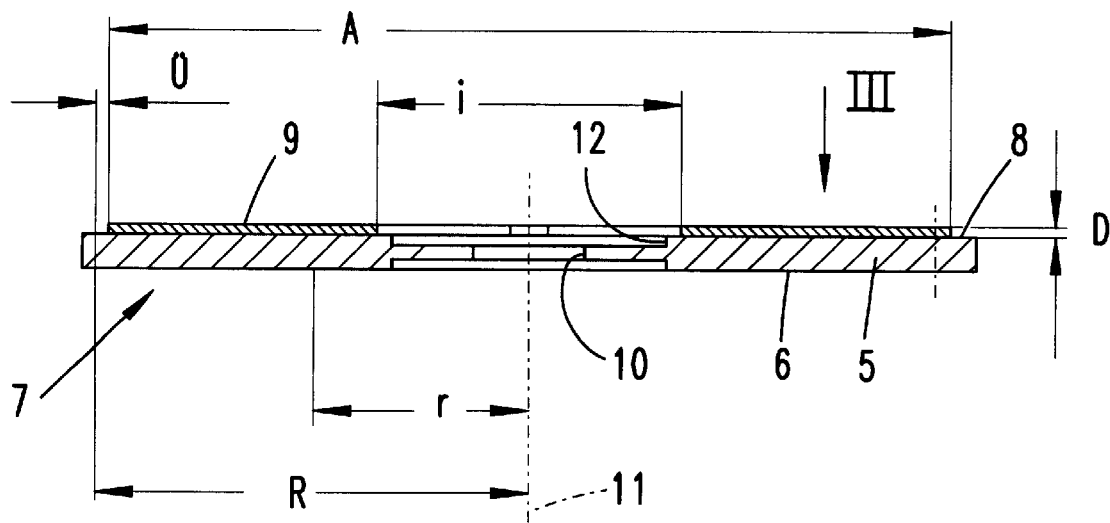
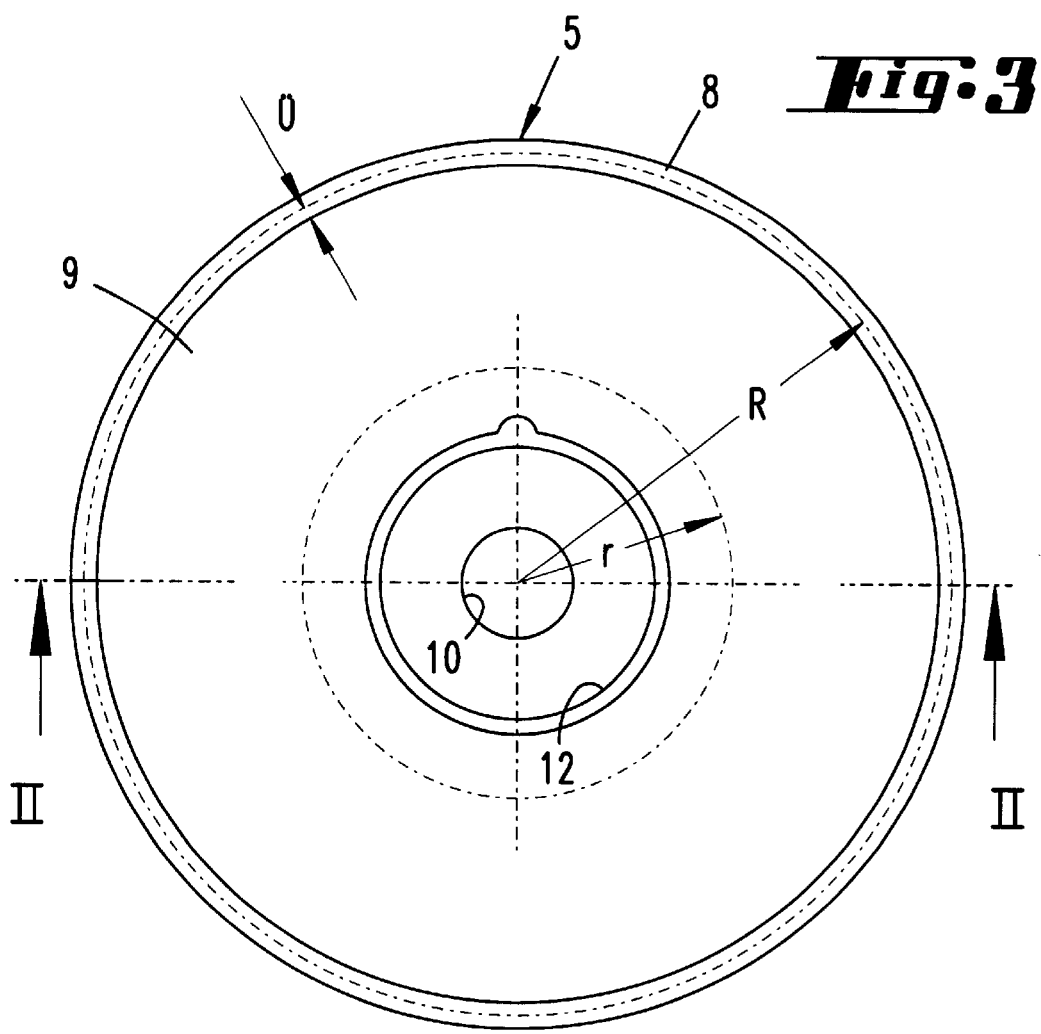

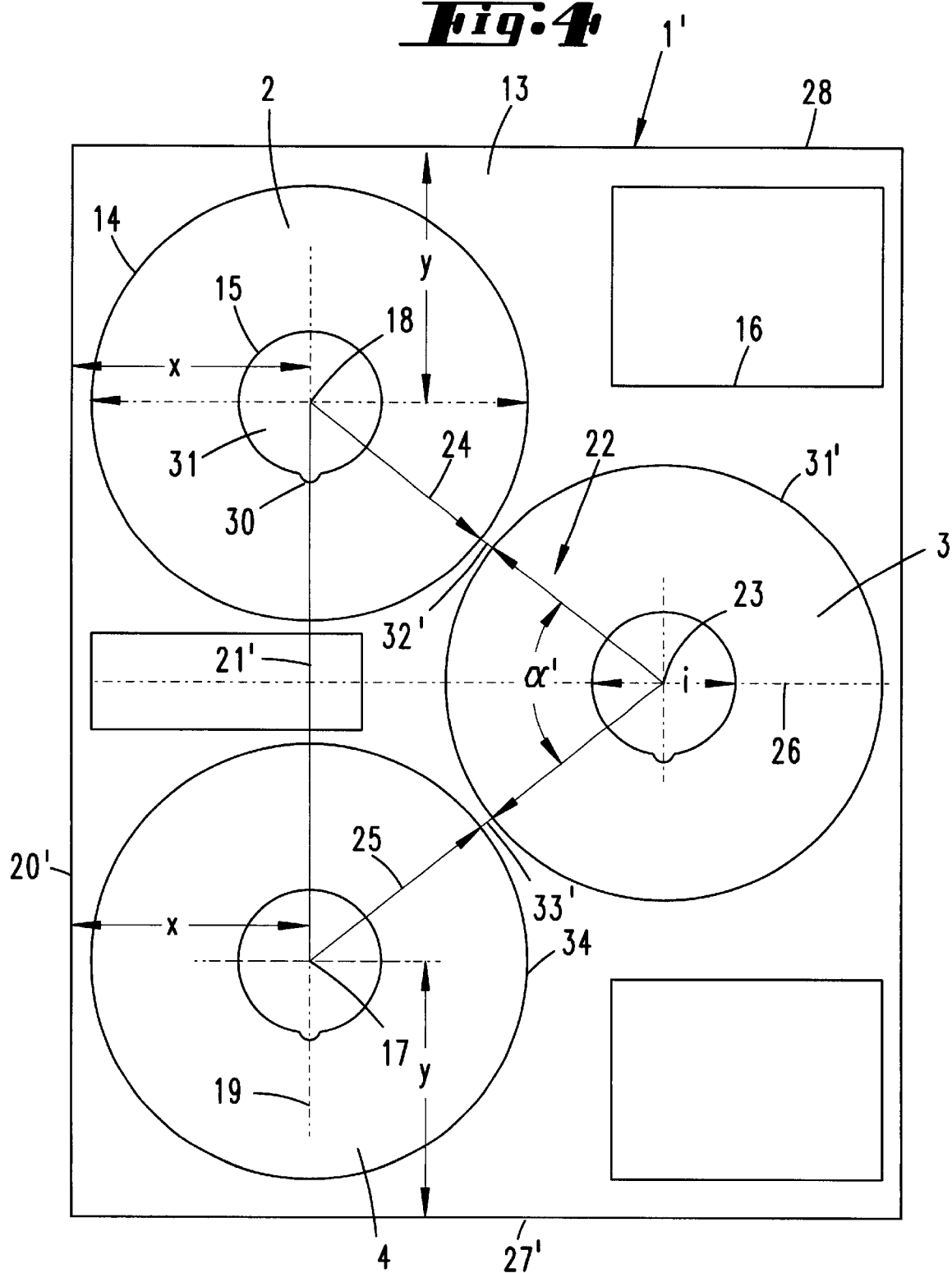

LABEL SHEET FOR ANNULAR LABELS FOR COMPACT DISKS

The invention relates to a label sheet, for example in DIN A4 format, with labels for labelling compact discs (CDs), wherein a compact disc has a read side and a rear side, and an external diameter of a readable and/or writeable region of the read side coincides with an external diameter of a region formed on the rear side, and furthermore that there are provided on the label sheet at least two annular labels for labelling the compact disc, said labels having an internal diameter and an external diameter.

BACKGROUND OF THE INVENTION

In particular since such compact discs have been used as writeable data carriers in conjunction with personal computers, it has been necessary for individual compact discs to be labelled individually as well. Already disclosed for this purpose are annular labels, for individual labelling of compact discs, in the case of which the external diameter corresponds, in practice, precisely to the external diameter of the readable or writeable region, or of the corresponding region on the rear side of the compact disc. Equally, the internal diameter of said labels is adapted to the readable region, or to the corresponding region on the rear side of the compact disc, this internal diameter exceeding said region somewhat in the radially inward direction.

It is known for compact discs to be read from and/or written to at relatively high rotational speeds in a compact-disc station. The labelling of compact discs thus has to be carried out with great care since inaccuracies may lead to an unbalance, which impairs the operation of reading from and/or writing to the compact disc or which may even damage the compact-disc station.

As far as the labelling of compact discs is concerned, various apparatuses have already been proposed.

Nevertheless, there is a need for further improving the combination of a compact disc with a label and, in particular, for specifying labels which are suitable for this purpose.

SUMMARY OF THE INVENTION

This technical problem is solved by based on the fact that the external diameter of a label is smaller than the external diameter of that region of the compact disc which corresponds to the readable region on the rear side, such that a clear projection of this region beyond the external diameter of the label of approximately 2 mm remains, and that the internal diameter of the label is adapted to a step formed on the rear side of the compact disc, such that said internal diameter exceeds a diameter dimension of the step in the radially outward direction merely by approximately 2 to 4 mm. It has been found, according to the invention, that, with substantially the same, or only negligibly reduced, overall surface area which is to have text provided on it, the writeable region can be shifted closer towards the centre. Since the regions which are located closer towards the center are less important, from the point of view of a possible unbalance, than the regions which are located further towards the outside, the displacement of the writeable region towards the inside achieves an improvement as far as sensitivity to unbalance is concerned. At the same time, a prominent compact-disc border region, which is usually shiny gold or at least silver on account of a reflection layer, remains visible even after labelling, and a compact disc labelled in this way is also easily recognized as such.

The label sheet may be provided not just in DIN A4 format, but, for example, also in U.S. letter-size format. In this case, it is possible for the narrow side, for example, to have a dimension of 21.5 cm and for the long side to have a dimension of 27.2 cm. It is preferably provided that three labels, in particular of the same size, for labelling compact discs are prepunched on the label sheet. It is intended here for the label sheet to be of two-layered design, with a carrying substrate to which a labelling film is applied in a detachable manner. The labels are then punched out in said labelling film. If three or, optionally, more labels are provided, it is further preferred for the center points of two labels to be arranged on a straight line parallel to a longitudinal edge of the label sheet, and for the distance between the two center points to form the base side of an isosceles triangle, of which the vertex which is located over the base side coincides with the center point of the third label. Such labels are preferably printed by means of a computer-controlled printer. For this purpose, precise orientation of the labels on the label sheet is necessary for accurate printing. The given arrangement means that—when the label sheet is running through a printer in its longitudinal extent-first of all labels are located one behind the other on a line which extends parallel to a longitudinal edge of the label sheet. This results, for these two labels, in the same type of printing-head control transversely with respect to the line feed. The given arrangement means that a third label is arranged centrally, between the two labels, in the longitudinal extent of the sheet, it being the case that the arrangement of the center points on an isosceles triangle achieves an equidistant spacing between the center points in the longitudinal extent.

Advancement of the printer is also simplified as a result and, with the same type of line feed, all that is required is for the positioning of the printing head to be shifted laterally. With the relevant dimensions of the labels, optimum utilization of a DIN A4 sheet is provided by a configuration in the case of which the center points of the three labels are arranged at the vertices of a right-angled triangle. It is also intended here, in particular, for the center points of two labels to be arranged on a straight line running parallel to a longitudinal edge of the label sheet, with the result that the right angle is defined by the connecting lines between these two center points on the straight line and the center point of the third label. A symmetrical design of the label sheet is also advantageous, it being the case that the labels are arranged symmetrically with respect to a center axis of symmetry of the sheet, in particular, with three labels, symmetrically with respect to the short center line of the label sheet, which runs transversely with respect to the longitudinal extent. This has the advantage that in the case of printer control with different introduction of a sheet with three labels in the arrangement described, all that is required is one coordinate change for the printing-head control transversely with respect to the line feed. If symmetry is provided on a label sheet with two labels arranged thereon, then it is also possible to provide, additionally or alternatively, symmetry with respect to the longitudinal center axis of symmetry of the sheet. If two-fold symmetry is provided, the labels are always printed correctly in a printer regardless of the sheet introduction. For straightforward handling of the labels, it is also provided that a contour of the label which is adapted to the internal diameter of the label has, at one location, a radially outwardly oriented, tongue-shaped section.

For drawing off the annular label, all that need then be done is to bend the label sheet in the plane in which it extends, it being possible for the tongue, which projects into the label, is formed by said section and belongs to the inner part which is to be removed, to be grasped and for said inner part to be removed. It is then also possible, in the region of this location, for the label itself to be easily removed from its carrying substrate. The arrangement of such a grip tongue or tongue-shaped recess in the region of the internal diameter also has the advantage that the tongue-shaped recess formed in this way in the label has hardly any effect as far as possible unbalance is concerned. Also contributing to this is the fact that the tongue-shaped section has a magnitude of approximately 10 to 12 mm$^2$, with a preferred depth in relation to the internal diameter, i.e. with a radial dimension, of less than 4 mm. A further measure also provides at least one rough surface, in particular that of the rear side of the label sheet. This measure provides good frictional locking between the transport rollers of a printer and thus a precise and reliable line feed for the operation of printing the labels. If the surface of the label itself, for example a self-adhesive film, is also rough, then it can also easily have text provided on it manually using conventional writing implements. In a further configuration, an extremely small distance of approximately 3 to 6 mm, preferably approximately 4 to 5 mm, is provided between two punch cuts of two labels along their respective external diameters. With such a selection of the distances, in particular on the connecting lines between the center points of two labels which are offset one beside the other in the longitudinal extent of the sheet, this predetermines a dimension which allows reliable detachment of the labels themselves.

On the other hand, the crosspieces remaining between the punch cuts adhere reliably to their carrier substrate and, as a result, further labels remain unaffected by the action of an individual label being detached. In the case of a conventional compact disc of approximately 12 cm in diameter, as is used as a CD-ROM, a label internal diameter of 3.7 mm and an external diameter of 11.3 mm is then ultimately preferred. In particular for such a compact disc with a read side, which has an annular read region, and with a rear side, which is provided with an annular label, this then results in the external diameter of the label being at least 2 mm smaller than the external diameter of the region which corresponds to the readable region on the rear side, and in the internal diameter of the label exceeding the diameter of a step, which is formed on the rear side, in the radially outward direction merely by approximately 2 to 4 mm.

In an embodiment, the present invention provides a sheet including a plurality of labels for an annular compact discs, each annular compact disc including a read side and a rear side, each disc further including a first internal diameter defining a central aperture, a second internal diameter defining a step that surrounds the central aperture of the disc and an outer diameter that defines an outer periphery of the disc, the step being disposed between the central aperture and the outer periphery, the annular labels for application to the rear side of the disc, each annular label comprising an external diameter that defines an outer periphery of the label, the external diameter of the label being less than the external diameter of the disc by a first distance of about 2 mm, an internal diameter that defines a central aperture of the label, the internal diameter of the label being greater than the second internal diameter of the disc by a second distance ranging from about 2 mm to about 4 mm; the sheet comprising at least two labels.

In an embodiment, the sheet comprises at least three labels, the inner and outer diameters of the three labels being pre-punched into the sheet.

In an embodiment, the label sheet comprises two parallel sides each having a length and two parallel ends each having a width, the internal and external diameters of each label define a center point for each label, the labels being disposed on the label sheet so that the center points thereof form an isosceles triangle.

In an embodiment, the center points of two of the labels are disposed along a straight line parallel to one of the parallel sides of the label sheet to form a base of the isosceles triangle.

In an embodiment, the label sheet comprises two parallel sides each having a length and two parallel ends each having a width, the internal and external diameters of each label define a center point for each label, the labels being disposed on the label sheet so that the center points thereof form a right triangle.

In an embodiment, the label sheet comprises two parallel sides each having a length and two parallel ends each having a width, the label sheet further comprising a center axis of symmetry parallel to and disposed between the two parallel ends of the label sheet, the internal and external diameters of each label define a center point for each label, the center points being disposed symmetrically with respect to the center axis of symmetry of the label sheet.

In an embodiment, each central aperture of each label comprises a radially outwardly protruding tongue.

In an embodiment, each tongue has a surface area ranging from about 10 mm$^2$ to 12 mm$^2$.

In an embodiment, each tongue has a radial length of less than or equal to 4 mm.

In an embodiment, the external diameters of the two labels that form the base of the isosceles triangle are spaced apart from the external diameter of the other label by a distance less than 5 mm.

In an embodiment, the label sheet comprises a rough surface.

In an embodiment, each internal diameter of each label is less than or equal to 3.7 cm and the external diameter of each label is less than or equal to 11.3 cm.

In an embodiment, the present invention provides a combination annular compact disc and annular label comprising the annular compact disc comprising a read side and a rear side, the disc further including a first internal diameter defining a central aperture, a second internal diameter defining a step that surrounds the central aperture of the disc and an outer diameter that defines an outer periphery of the disc, the step being disposed between the central aperture and the outer periphery, the annular label for application to the rear side of the disc, the annular label comprising an external diameter that defines an outer periphery of the label, the external diameter of the label being less than the external diameter of the disc by a first distance of about 2 mm, an internal diameter that defines a central aperture of the label, the internal diameter of the label being greater than the second internal diameter of the disc by a second distance ranging from about 2 mm to about 4 mm.

Other objects and advantages of the present invention will become apparent from reading the following detailed description and appended claims, and upon reference to the accompanying drawings.

BRIEF DESCRIPTION OF THE DRAWINGS

The invention will be explained in more detail with reference to the drawing, in which just one exemplary embodiment is illustrated.

FIG. 1 illustrates, in plan view, a label sheet with three labels arranged on it, FIG. 2 illustrates a section through a labelled compact disc, FIG. 3 illustrates a plan view of a labelled compact disc according to the arrow III in FIG. 2, and FIG. 4 illustrates a further embodiment of a label sheet, with dimensions in the letter-size format.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

FIG. 1 shows a scaled-down label sheet 1 in DIN A4 format with annular labels 2, 3, 4 for labelling compact discs 5 in accordance with FIGS. 2 and 3. The compact disc 5 in question has a read side 6, and it is possible to read from and/or write to the region 7 of the read side 6, said region 7 extending from an internal diameter r to an external diameter R. The rear side 8, which is located opposite the read side 6, is not usually provided for this purpose, but rather for receiving printed-on information, for example in the case of music compact discs, or for labelling, for example in the case of writeable CD-ROMs. The latter usually have shiny silver read and rear sides 6 and 8, respectively, which are produced by a central reflection layer consisting, for example, of aluminum.

While, in FIGS. 2 and 3, the radial dimensions are more or less faithfully reproduced, it is the case that, in the section according to FIG. 2, the thickness is considerably exaggerated, for illustrative reasons, for example the thickness D of a label 9 which is adhesively bonded onto the compact disc 5 and may consist, for example, of a self-adhesive film of just a few 10 μm in thickness. The compact discs 5 in question are read from and/or written to in stations (not illustrated further), in which, once positioned on a pin which passes through a central through-passage 10, they rotate at high speed about an axis of rotation 11.

The problems, mentioned in the introduction, resulting from the high rotational speed, for example an unbalance, are avoided according to the invention by annular labels of which the external diameter A is smaller than twice the external radius R of the readable region 7, projected onto the rear side. In this case, this projection Ü beyond the external diameter A of the label is at least 2 mm. Furthermore, the internal diameter i of the labels 2, 3, 4, 9 is adapted to a step 12 formed on the rear side 8 of the compact disc 5, such that the internal diameter i exceeds a diameter dimension of the step 12 in the radially outward direction merely by approximately 2 to 4 mm, in this case in particular 2 mm.

The three labels 2, 3, 4 of the label sheet 1 according to FIG. 1 are punched out, in particular, from a self-adhesive label material 13 which, in a manner known per se, is adhesively bonded on a carrier in a detachable manner. Accordingly, in addition to the boundary of a label, contour lines 14 to 16 also constitute a punch cut.

FIG. 1 also shows that the center points 17, 18 of the labels 2, 4 are arranged on a straight line 19 parallel to a longitudinal edge 20 of the label sheet 1. The distance 21 between the center points 17, 18 forms the base side of an isosceles triangle 22, in this case depicted in comparatively thin lines, of which the vertex which is located over the base side, or the distance 21, coincides with the center point 23 of the third label 3. The two legs of the triangle 22 which are of equal length, namely the distances 24, 25 between the center points 18, 23 and 17, 23, respectively, in this case define an angle alpha of 90°. As a result, the center points 17, 18, 23 of the three labels 2, 3, 4 are arranged at the vertices of a right-angled triangle 22.

Since the label sheet 1 in DIN A4 format shown usually runs through, for example, a printer in its longitudinal extent so that the labels can have text provided on them, it is expedient to provide, in particular, the annular labels 2, 3, 4 for labelling compact discs 5 such that they are symmetrical with respect to a center axis of symmetry, in this case the shorter, transverse axis of symmetry 26. In the case of the exemplary embodiment according to FIG. 1, this gives in the longitudinal extent, regardless of the direction, equal spacings in each case between the center points 17, 18 and the corresponding transverse borders 27, 28 of the sheet 1, and the center point 23 is located directly on the axis of symmetry 26.

It is alternatively possible, in the case of, for example, an arrangement with just two annular labols, for the center points of these labels to be arranged on a longitudinal axis of symmetry of the sheet and also, additionally or alternatively, symmetrically with respect to the transverse axis of symmetry.

The punch cut or the contour 15 of the label 2, which is adapted to the internal diameter i of said label 2 and also of the other labels 3, 4, 9, has, at one location, in each case a radially outwardly oriented, tongue-shaped section 30. The surface area of the latter is approximately 10 to 12 mm², the radial dimension being just 4 mm or, as in this case, less, namely approximately only 2 mm. By virtue of these small dimensions and the positioning in the direction of the axis of rotation 11, this "disturbance" results in hardly any unbalance or the like. On the other hand, the dimensions are sufficient to allow, during bending of the label sheet 1, the punching to come open along the contour 15 and the label 2, or even initially the central region 31, to be grasped by the tongue itself, which is formed by the tongue-shaped section 30.

A distance 32 of approximately 3 to 6 mm, in this case between 4 and 5 mm, is provided between two punch cuts 14, 31' of the labels 2, 3 along their respective external diameters. The symmetrical arrangement means that there is an identical distance 33 between the punch cut 31' of the label 3 and the punch cut 34 of the label 4.

In the case of the compact disc 5 having a diameter of approximately 12 cm, the actual dimensions selected for the labels 2, 3, 4 and 9 are an internal diameter i of 3.7 cm and an external diameter A of 11.3 cm, it also being quite possible to select smaller diameters.

The drawing does not illustrate the fact that the two surfaces, namely the rear side and the text side of the label sheet, may be roughened. As explained in the introduction, the operations of providing text on the sheet 1 and of transporting the latter through transport rollers, for example, of a printer are made even easier as a result.

In further explanation of the label sheet of FIG. 1, it should also be pointed out that a distance x between the center points 17 and a longitudinal edge 20 and a distance y between said center points and a transverse border 27, 28 are the same in each case for the two labels arranged one above the other along the longitudinal edge 20. The distance y is greater than the distance x. In the case of the exemplary embodiment of FIG. 1, distance x is greater than the dimension of the distance 24 (half the dimension A) approximately by the distance 32, specifically by approximately 5.5 mm. The dimension y is greater than the dimension 24 approximately by twice the dimension 32, that is to say by approximately 10 mm in the case of the exemplary embodiment.

The exemplary embodiment of FIG. 4 shows a further label sheet 1', of which the longitudinal edge 20' has a length of approximately 27.2 cm and the transverse edge 27' has a length of approximately 21.5 cm.

The labels 2, 3 and 4, including the central regions 31, are formed in identical manner to the label sheet of FIG. 1 and, in this regard, reference is made to the relevant part of the description.

In particular, the labels 2, 3 and 4 according to FIG. 4 have, in the same way, a tongue-shaped recess 30. It is also significant, in the case of both embodiments, that the tongue-shaped recesses 30 are arranged in the downward direction in each case on the label sheet, such that they are oriented towards the transverse edge 27 or 27'. In specific terms, the recesses 30 are formed such that their center line of symmetry coincides with the line which connects the two center points of the Labels 2 and 4 (see spacing lines 21 and 21'). Correspondingly, the line of symmetry of the tongue-shaped recess 30 of the label 3—for reasons of clarity this line of symmetry has not been illustrated—is aligned parallel to the spacing line 21 or 21'.

It is pertinent to the embodiment of FIG. 4 that an opening angle between the respective connecting lines between the center points of the labels 2 and 4 and the label 3 is less than 90°. In the case of the exemplary embodiment, the opening angle alpha' is approximately 76°. This achieves a more compact arrangement of the labels on the label sheet in comparison with the embodiment of FIG. 1.

In the case of the embodiment of FIG. 4, the dimension 32' or 33' is reduced compared with the embodiment of FIG. 1. In the case of the embodiment of FIG. 4, the dimension 32' or 33' corresponds in order of magnitude to the length dimension of the tongue-shaped recess 30. Specifically, the dimension 32' or 33' is 3 mm.

In contrast, the dimension 32 or 33 in the case of the embodiment of FIG. 1 is approximately double the size of the radial dimension of the tongue-shaped recess 30.

In contrast, the dimensions x and y are the same for both embodiments.

All features disclosed are pertinent to the invention. The disclosure content of the associated/attached priority documents (copy of the prior application) are hereby also included in full in the disclosure of the application, also for the purpose of adopting features of these documents in claims of the present application.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A sheet including a plurality of annular labels for annular compact discs, each annular compact disc including a read side and a rear side, each disc further including a first internal diameter defining a central aperture, a second internal diameter defining a step that surrounds the central aperture of the disc and an outer diameter that defines an outer periphery of the disc, the step being disposed between the central aperture and the outer periphery, the annular labels for application to the rear side of the disc, each annular label comprising:

an external diameter that defines an outer periphery of the label, the external diameter of the label being less than the outer diameter of the disc by a first distance of about 2 mm, an internal diameter that defines a central aperture of the label, the internal diameter of the label being greater than the second internal diameter of the disc by a second distance ranging from about 2 mm to about 4 mm, each central aperture of each label having a radially outwardly protruding recess, the sheet comprising at least two labels.

2. The label sheet of claim 1 wherein the sheet comprises only three labels, the inner and outer diameters of the three labels being pre-punched into the sheet.

3. The label sheet of claim 1, wherein each recess has a surface area ranging from about 10 mm$^2$ to 12 mm$^2$.

4. The label sheet of claim 1, wherein each recess has a radial length of less than or equal to 4 mm.

5. The label sheet of claim 1 wherein the label sheet comprises a rough surface.

6. The label sheet of claim 1 wherein each internal diameter of each label is less than or equal to 3.7 cm and the external diameter of each label is less than or equal to 11.3 cm.

7. A sheet according to claim 1, wherein the compact disc has a readable region having an external diameter less than the outer diameter of the compact disc and the external diameter of the label being less than the external diameter of the readable region.

8. The label sheet of claim 2 wherein the label sheet comprises two parallel sides each having a length and two parallel ends each having a width, the internal and external diameters of each label define a center point for each label, the labels being disposed on the label sheet so that the center points thereof form an isosceles triangle.

9. A The label sheet of claim 2 wherein the label sheet comprises two parallel sides each having a length and two parallel ends each having a width, the internal and external diameters of each label define a center point for each label, the labels being disposed on the label sheet so that the center points thereof form a right triangle.

10. The label sheet of claim 2 wherein the label sheet comprises two parallel sides each having a length and two parallel ends each having a width, the label sheet further comprising a center axis of symmetry parallel to and disposed between the two parallel ends of the label sheet, the internal and external diameters of each label define a center point for each label, the center points being disposed symmetrically with respect to the center axis of symmetry of the label sheet.

11. The label sheet of claim 8 wherein the center points of two of the labels are disposed along a straight line parallel to one of the parallel sides of the label sheet to form a base of the isosceles triangle.

12. The label sheet of claim 11 wherein the external diameters of the two labels that form the base of the isosceles triangle are spaced apart from the external diameter of the other label by a distance less than 5 mm.

13. A combination annular compact disc and annular label comprising:

the annular compact disc comprising a read side and a rear side, the disc further including a first internal diameter defining a central aperture, a second internal diameter defining a step that surrounds the central aperture of the disc and an outer diameter that defines an outer periphery of the disc, the step being disposed between the central aperture and the outer periphery, the annular label for application to the rear side of the disc, the annular label comprising an external diameter that defines an outer periphery of the label, the external diameter of the label being less than the outer diameter of the disc by a first distance of about 2 mm, an internal diameter that defines a central aperture of the label, the internal diameter of the label being greater than the second internal diameter of the disc by a second distance ranging from about 2 mm to about 4 mm, and the central aperture of the label having a radially outwardly protruding recess.

14. The combination disc and label of claim 13, wherein the recess has a surface area ranging from about 10 mm$^2$ to 12 mm$^2$.

15. The combination disc and label of claim 13, wherein the recess has a radial length of less than or equal to 4 mm.

16. The combination disc and label of claim 13 the label comprises a rough surface.

17. The combination disc and label of claim 13 wherein the internal diameter of the label is less than or equal to 3.7 cm, the external diameter of the label is less than or equal to 11.3 cm and the external diameter of the disc is about 12 cm.

18. A sheet according to claim 13, wherein the compact disc has a readable region with an external diameter less than the outer diameter of the disc and the external diameter of the label being less than the external diameter of the readable region so that an outer annular portion of the readable portion is visible from the rear side of the compact disc.

* * * * *